US012659478B2

(12) United States Patent
Hu et al.

(10) Patent No.: US 12,659,478 B2
(45) Date of Patent: Jun. 16, 2026

(54) ADAPTIVE LOOP FILTER COEFFICIENT BIT DEPTH IN VIDEO CODING

(71) Applicant: QUALCOMM Incorporated, San Diego, CA (US)

(72) Inventors: Nan Hu, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 18/944,572

(22) Filed: Nov. 12, 2024

(65) Prior Publication Data

US 2025/0159154 A1    May 15, 2025

Related U.S. Application Data

(60) Provisional application No. 63/599,358, filed on Nov. 15, 2023.

(51) Int. Cl.
| | |
|---|---|
| *H04N 19/117* | (2014.01) |
| *H04N 19/176* | (2014.01) |
| *H04N 19/70* | (2014.01) |
| *H04N 19/82* | (2014.01) |

(52) U.S. Cl.
CPC ......... *H04N 19/117* (2014.11); *H04N 19/176* (2014.11); *H04N 19/70* (2014.11); *H04N 19/82* (2014.11)

(58) Field of Classification Search
None
See application file for complete search history.

(56) References Cited

U.S. PATENT DOCUMENTS

2022/0239909 A1 * 7/2022 Alshina ................. H04N 19/30

OTHER PUBLICATIONS

International Search Report and Written Opinion—PCT/US2024/055713—ISA/EPO—Mar. 7, 2025 12 Pages.
Su Y-C., et al., "CE2.2.1 and CE2.2.2: Alf Coefficient Coding and Range Constraints," 12. JVET Meeting, Oct. 3, 2018-Oct. 12, 2018, Macao, (The Joint Video Exploration Team of ISO/IEC JTC1/SC29/WG11 and ITU-T SG. 16 ), No. JVET-L0082, Oct. 4, 2018, 7 Pages, XP030194618, abstract Section 1 Section 2.2.
Su Y-C., et al., "CE2-related: Reduction of bits for ALF Coefficient Fractional Part," 12. JVET Meeting, Oct. 3, 2018-Oct. 12, 2018, Macao, (The Joint Video Exploration Team of ISO/IEC JTC1/SC29/WG11 and ITU-T SG. 16 ), No. JVET-L0083, Oct. 4, 2018, 9 Pages, XP030250903, abstract Section 1.

(Continued)

*Primary Examiner* — Nam D Pham
(74) *Attorney, Agent, or Firm* — Shumaker & Sieffert, P. A.

(57) ABSTRACT

A device for decoding encoded video data is configured to determine a block from the encoded video data; determine a bit depth for an adaptive loop filter from a plurality of available bit depths for the adaptive loop filter; determine coefficient values for a set of filter coefficients for the adaptive loop filter based on the bit depth; apply the adaptive loop filter to the block to determine a filtered block of video data; determine a decoded version of the block of video data based on the filtered block of video data; and output a decoded picture of video data that includes the decoded version of the block of video data.

20 Claims, 7 Drawing Sheets

(56) References Cited

OTHER PUBLICATIONS

Coban M., et al., "Algorithm Description of Enhanced Compression Model 10 (ECM 10)", JVET-AE2025, JVET-AE2025-v1, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.

Coban M., et al., "Algorithm Description of Enhanced Compression Model 11 (ECM 11)", JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.

Coban M., et al., "Algorithm Description of Enhanced Compression Model 12 (ECM 12)", Joint Video Experts Team (JVET) of ITU-T SG 16 WP 3 and ISO/IEC JTC 1/SC 2933rd Meeting, by teleconference, Jan. 17-26, 2024, JVET-AG2025, pp. 1-91.

Hu N., et al., "EE2-4.3: Adaptive Precision for Luma ALF Coefficients", Joint Video Experts Team (JVET) of ITU-T SG 16 WP 3 and ISO/IEC JTC 1/SC 29, 33rd Meeting, by Teleconference, Jan. 17-26, 2024, JVET-AG0158-v1, pp. 1-3.

Hu N., et al., "EE2-Related: Adaptive Precision for CCALF Coefficients", Joint Video Experts Team (JVET) of ITU-T SG 16 WP 3 and ISO/IEC JTC 1/SC 29, 33rd Meeting, by Teleconference, Jan. 17-26, 2024, JVET-AG0233-v2, pp. 1-3.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Itu-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.

Karczewicz M., et al., "VVC In-Loop Filters", IEEE Transactions on Circuits and Systems for Video Technology, vol. 31, No. 10, Oct. 2021, Apr. 9, 2021, pp. 3907-3925.

Song N., et al., "EE2-5.1: Adaptive Precision for CCALF Coefficients", Joint Video Experts Team (JVET) of ITU-T SG 16 WP 3 and ISO/IEC JTC 1/SC 29, 34th Meeting, Rennes, FR, Apr. 17-24, 2024, JVET-AH0057-v3, pp. 1-6.

Song N., et al., "Non-EE2: Adaptive Coefficient Precision for CCALF", Joint Video Experts Team (JVET) of ITU-T SG 16 WP 3 and ISO/IEC JTC 1/SC 29, 33rd Meeting, by Teleconference, Jan. 17-26, 2024, JVET-AG0065-v1, pp. 1-3.

Yin W., et al., "Non-EE2: Coefficient Precision Adjustment for ALF", Joint Video Experts Team (JVET) of ITU-T SG 16 WP 3 and ISO/IEC JTC 1/SC 29, 32nd Meeting, Hannover, DE, Oct. 13-20, 2023, JVET-AF0198-v2, pp. 1-3.

* cited by examiner

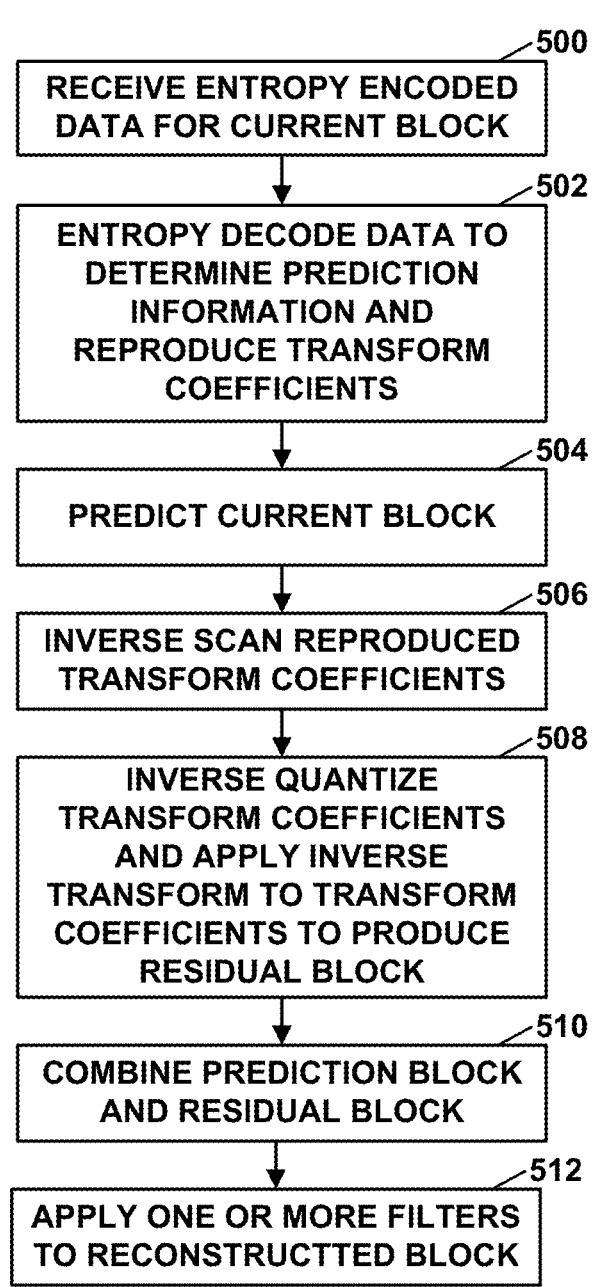

500
RECEIVE ENTROPY ENCODED
DATA FOR CURRENT BLOCK

502
ENTROPY DECODE DATA TO
DETERMINE PREDICTION
INFORMATION AND
REPRODUCE TRANSFORM
COEFFICIENTS

504
PREDICT CURRENT BLOCK

506
INVERSE SCAN REPRODUCED
TRANSFORM COEFFICIENTS

508
INVERSE QUANTIZE
TRANSFORM COEFFICIENTS
AND APPLY INVERSE
TRANSFORM TO TRANSFORM
COEFFICIENTS TO PRODUCE
RESIDUAL BLOCK

510
COMBINE PREDICTION BLOCK
AND RESIDUAL BLOCK

512
APPLY ONE OR MORE FILTERS
TO RECONSTRUCTTED BLOCK

FIG. 5

DETERMINE COEFFICIENT
VALUES FOR A SET OF ONE
OR MORE FILTERS FOR A
GROUP OF BLOCKS OF
ENCODED VIDEO DATA,
WHEREIN THE SET OF FILTERS
ARE FOR AN ADAPTIVE LOOP
FILTER PROCESS

DETERMINE A BIT DEPTH FOR
SIGNALING THE COEFFICIENT
VALUES

OUTPUT ENCODED VIDEO
DATA, WHEREIN THE
ENCODED VIDEO DATA
INCLUDES AN INDICATION OF
THE BIT DEPTH

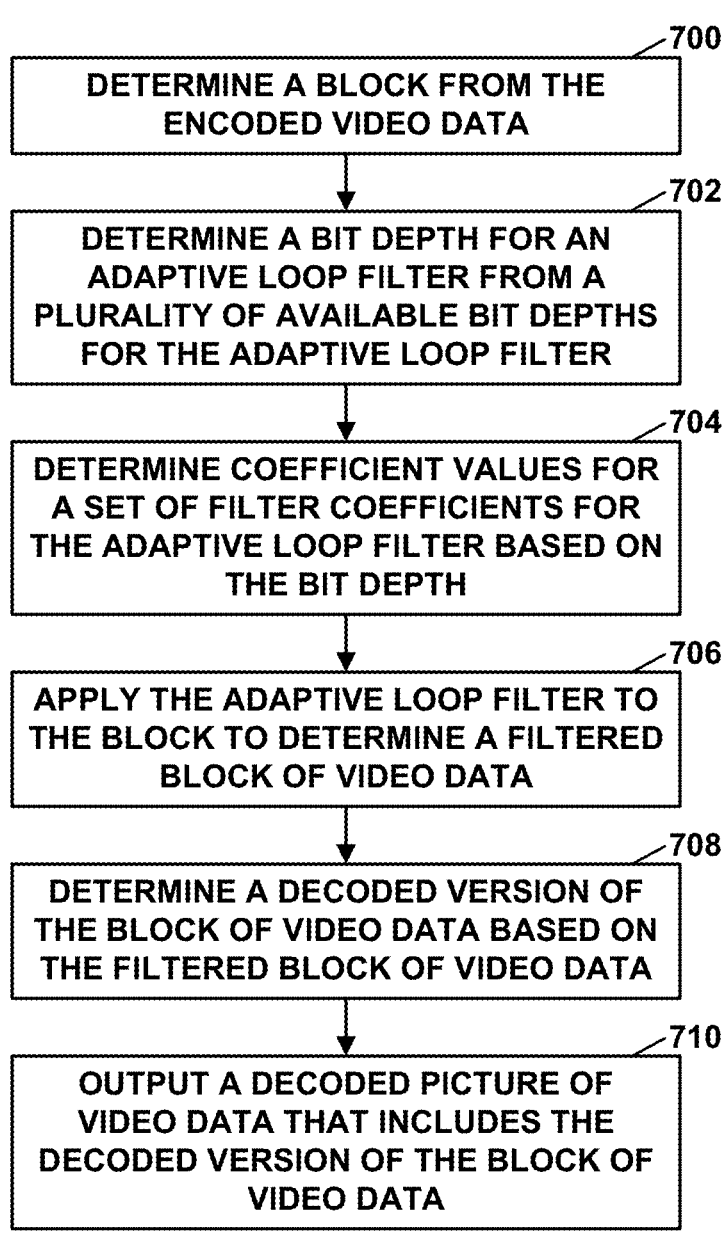

700
DETERMINE A BLOCK FROM THE
ENCODED VIDEO DATA

702
DETERMINE A BIT DEPTH FOR AN
ADAPTIVE LOOP FILTER FROM A
PLURALITY OF AVAILABLE BIT DEPTHS
FOR THE ADAPTIVE LOOP FILTER

704
DETERMINE COEFFICIENT VALUES FOR
A SET OF FILTER COEFFICIENTS FOR
THE ADAPTIVE LOOP FILTER BASED ON
THE BIT DEPTH

706
APPLY THE ADAPTIVE LOOP FILTER TO
THE BLOCK TO DETERMINE A FILTERED
BLOCK OF VIDEO DATA

708
DETERMINE A DECODED VERSION OF
THE BLOCK OF VIDEO DATA BASED ON
THE FILTERED BLOCK OF VIDEO DATA

710
OUTPUT A DECODED PICTURE OF
VIDEO DATA THAT INCLUDES THE
DECODED VERSION OF THE BLOCK OF
VIDEO DATA

FIG. 7

ADAPTIVE LOOP FILTER COEFFICIENT BIT DEPTH IN VIDEO CODING

This application claims the benefit of U.S. Provisional Patent Application No. 63/599,358, filed 15 Nov. 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure generally relate to the signaling of filter coefficients for adaptive loop filtering (ALF). As will be explained in more detail below, filter coefficients for ALF are typically signaled using a fixed bit depth, such as 8 bits. For example, a video decoder receives a syntax element (e.g., alf_chroma_coeff_abs below) indicating an absolute value for the coefficient at the fixed bit depth. Thus, if the bit depth is 8 bits, then the syntax element uses 8 bits to represent the fractional part of the value, and the real decimal value is equal to the signaled value divided by $2^{(bit\ depth\ -1)}$. The video decoder also receives a syntax element (e.g., alf_chroma_coeff_sign below) indicating a sign (negative or positive) for the coefficient. When applying the filter, the video decoder then determines the value of the coefficient to be the absolute value multiplied by the sign (either 1 or −1) and divided by $2^{(bit\ depth-1)}$. Thus, a filter coefficient of 0.5 would be signaled as an 8-bit absolute value of 01000000, which is equal to 64 and 64 is signaled in the bit stream, which when divided by $2^{(8-1)}$ equals 64/128, which is 0.5.

Generally, using a larger bit depth for filter coefficients allows the coefficients to have a greater number of possible values, which may improve the quality of the filtering, but the larger bit depth also increases the signaling overhead for those filter coefficients. In contrast, using less bit depth may reduce the overhead. For example, for a filter coefficient of 0.5, if a bit depth of 6 is used, a value of $0.5*(2^{(6-1)})=16$ is signaled in the bit stream, which is smaller and uses fewer bits than 64. Some values obtainable using 8 bits, however, are not obtainable using only 6 bits.

This disclosure introduces ALF with adaptive, i.e., non-fixed, bit depth coefficients. By determining a bit depth for an ALF from a plurality of available bit depths for the ALF and determining coefficient values for a set of filter coefficients for the ALF based on the bit depth, a video coder configured according to the techniques of this disclosure may reduce the signaling overhead associated with ALF for coding scenarios where a smaller number of possible coefficient values achieves adequate filtering while also maintaining the ability to use a larger bit depth for coding scenarios where a greater number of possible coefficient values are desirable. Accordingly, the techniques of this disclosure may improve the rate-distortion tradeoff for some video coding scenarios and provide more flexibility for video encoders and video decoders to achieve a desired bit rate.

According to an example of this disclosure, a method of decoding encoded video data includes determining a block from the encoded video data; determining a bit depth for an adaptive loop filter from a plurality of available bit depths for the adaptive loop filter; determining coefficient values for a set of filter coefficients for the adaptive loop filter based on the bit depth; applying the adaptive loop filter to the block to determine a filtered block of video data; determining a decoded version of the block of video data based on the filtered block of video data; and outputting a decoded picture of video data that includes the decoded version of the block of video data.

According to an example of this disclosure, a device for decoding encoded video data includes a memory; and one or more processors implemented in circuitry, coupled to the memory, and configured to: determine a block from the encoded video data; determine a bit depth for an adaptive loop filter from a plurality of available bit depths for the adaptive loop filter; determine coefficient values for a set of filter coefficients for the adaptive loop filter based on the bit depth; apply the adaptive loop filter to the block to determine a filtered block of video data; determine a decoded version of the block of video data based on the filtered block of video data; and output a decoded picture of video data that includes the decoded version of the block of video data.

According to an example of this disclosure, a method of encoding video data includes determining coefficient values for a set of one or more filters for a group of blocks of encoded video data, wherein the set of filters are for an adaptive loop filter process; determining a bit depth for signaling the coefficient values; and outputting encoded video data, wherein the encoded video data includes an indication of the bit depth.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example process for decoding a current block in accordance with the techniques of this disclosure.

FIG. 7 is a flowchart illustrating an example process for decoding a current block in accordance with the techniques of this disclosure.

DETAILED DESCRIPTION

Figure 1:
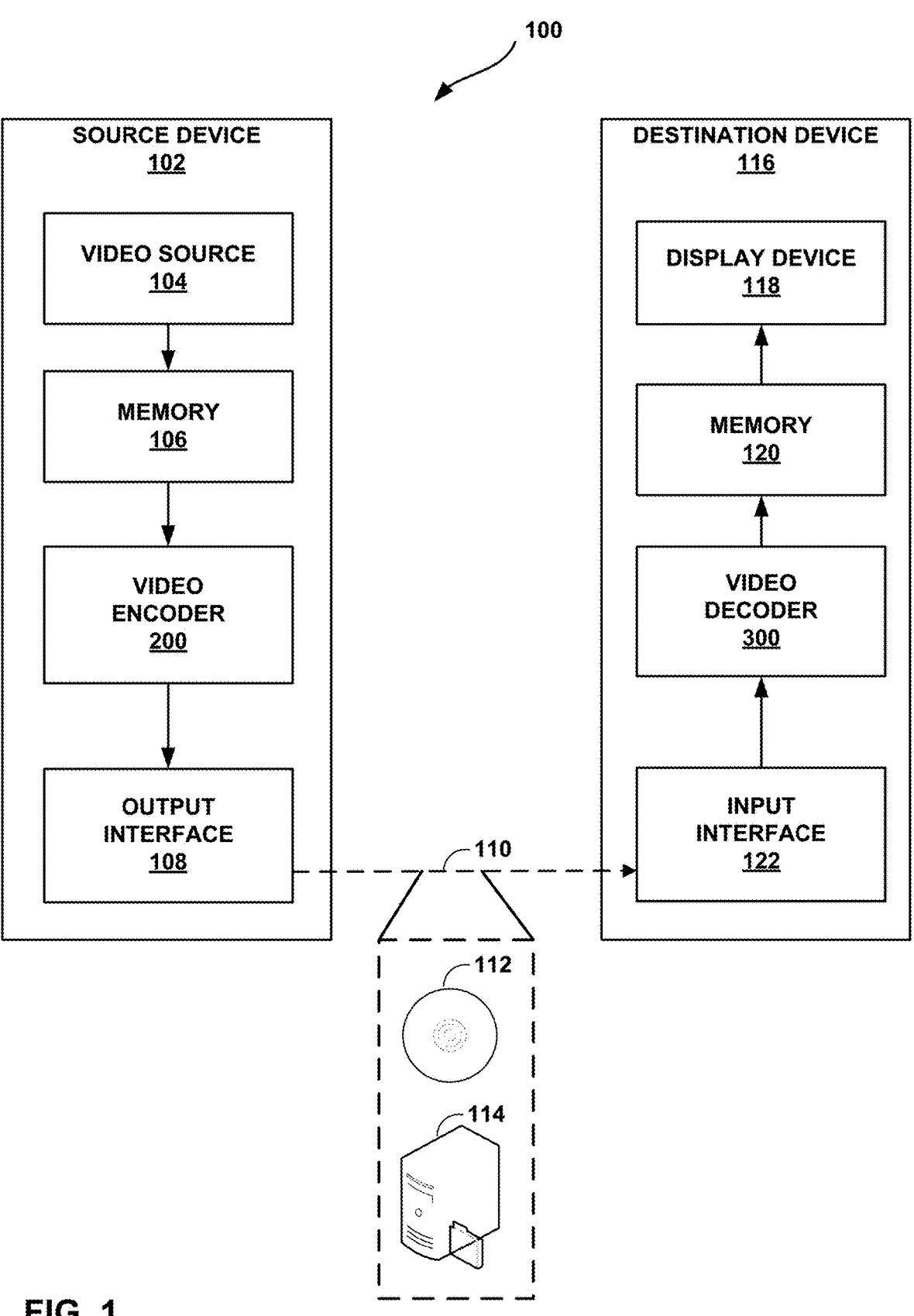
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure generally relate to the signaling of filter coefficients for ALF. As will be explained in more detail below, typically filter coefficients for ALF are signaled using a fixed bit depth, such as 8. For example, a video decoder receives a syntax element (e.g., alf_chroma- _coeff_abs below) indicating an absolute value for the coefficient at the fixed bit depth. Thus, if the bit depth is 8, then the syntax element uses 8 bits to represent the fractional part of the value, and the real decimal value is equal to the signaled value divided by $2^{\wedge}(\text{bit depth}-1)$. The video decoder also receives a syntax element (e.g., alf_chroma-_coeff_sign below) indicating a sign (negative or positive) for the coefficient. When applying the filter, the video decoder then determines the value of the coefficient to be the absolute value multiplied by the sign (either 1 or −1) and divided by $2^{\wedge}(\text{bit depth}-1)$. Thus, a filter coefficient of 0.5 would be signaled as an 8-bit absolute value of 01000000, which is equal to 64 and 64 is signaled in the bit stream, which when divided by $2^{\wedge}(8-1)$ equals 64/128, which is 0.5.

Generally, using a larger bit depth for filter coefficients allows the coefficients to have a greater number of possible values, which may improve the quality of the filtering, but the larger bit depth also increases the signaling overhead for those filter coefficients. In contrast, using less bit depth may reduce the overhead. For example, for a filter coefficient of 0.5, if a bit depth of 6 is used, a value of $0.5*(2^{\wedge}(6-1))=16$ is signaled in the bit stream, which is smaller and uses fewer bits than 64. Some values obtainable using 8 bits, however, are not obtainable using only 6 bits.

This disclosure introduces ALF with adaptive, i.e., non-fixed, bit depth coefficients. By determining a bit depth for an ALF from a plurality of available bit depths for the ALF and determining coefficient values for a set of filter coefficients for the ALF based on the bit depth, a video coder configured according to the techniques of this disclosure may reduce the signaling overhead associated with ALF for coding scenarios where a smaller number of possible coefficient values achieves adequate filtering while also maintaining the ability to use a larger bit depth for coding scenarios where a greater number of possible coefficient values are desirable. Accordingly, the techniques of this disclosure may improve the rate-distortion tradeoff for some video coding scenarios and provide more flexibility for video encoders and video decoders to achieve a desired bit rate.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for ALF and signaling of ALF coefficients. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for ALF and signaling of ALF coefficients described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder

200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB), G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use ALF.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction ($y=16$) and 16 samples in a horizontal direction ($x=16$). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In a typical video encoder, such as video encoder 200, a frame of the original video sequence is partitioned into rectangular regions or blocks, which are encoded in intra-mode (I-mode) or inter-mode. The blocks are coded using some kind of transform coding, such as DCT coding. However, pure transform-based coding only reduces the inter-pixel correlation within a particular block, without considering the inter-block correlation of pixels, and still produces high bit-rates for transmission. Current digital image coding standards also utilize certain process that reduce the correlation of pixel values between blocks.

In general, blocks encoded in inter mode are predicted from a number of the previously coded and transmitted frames. The prediction information of a block can be for example represented by a two-dimensional (2D) motion vector. For the blocks encoded in I-mode, the predicted block is formed using spatial prediction from already encoded neighboring blocks within the same frame. The prediction error, e.g., the difference between the block being encoded and the predicted block is represented as a set of weighted basis functions of some discrete transform. The transform is typically performed on a block basis. The weights (e.g., transform coefficients) are subsequently quantized. Quantization introduces loss of information and, therefore, quantized coefficients typically have lower precision than the originals.

Quantized transform coefficients, together with motion vectors and some control information, form a complete coded sequence representation and are referred to as syntax elements. Prior to transmission from the encoder to the decoder, syntax elements may be entropy coded so as to further reduce the number of bits needed for their representation.

At a decoder, such as video decoder 300, the block in the current frame is obtained by first constructing its prediction in the same manner as in the encoder and by adding to the prediction (e.g., a predictive block) the compressed prediction error (e.g., a residual block). The compressed prediction error is found by weighting the transform basis functions using the quantized coefficients. The difference between the reconstructed frame and the original frame is called reconstruction error.

In the field of video coding, it is common to apply filtering in order to enhance the quality of a decoded video signal. The filter can be applied as a post-filter, where a filtered frame is not used for prediction of future frames, or applied as an in-loop filter, where a filtered frame is used to predict future frames. A filter can be designed, for example, by minimizing the error between the original signal and the decoded filtered signal. Similar to transform coefficients, the coefficients of the filter $h(k, l)$, $k=-K, \ldots, K$, $l=-K, \ldots K$ are quantized:

$$c(k, l) = \mathrm{round}(normFactor \cdot h(k, l))$$

The quantized coefficients are coded and sent to the decoder. The normFactor is usually equal to $2^n$. A larger value of normFactor generally corresponds to a more precise quantization and to quantized filter coefficients $c(k, l)$ that provide better performance. On the other hand, larger values of normFactor also produce coefficients $c(k, l)$ requiring more bits to transmit.

At the decoder, the decoded filter coefficients $c(k, l)$ are applied to the reconstructed image $R(i,j)$ as follows:

$$\tilde{R}(i, j) = \sum_{k=-K}^{K} \sum_{l=-K}^{K} c(k, l) R(i + k, j + l), \qquad (2)$$

where i and j are the coordinates of the pixels within the frame. The filter coefficients can be also applied to the differences $f(k, l)$ between the to-be-filtered sample $R(i,j)$ and its neighboring samples:

$$f(k, l) = R(i + k, j + l) - R(i, j).$$

In this example, the sample $\tilde{R}(x, y)$ is obtained by adding the resulting sum to the reconstructed sample $R(x, y)$. The differences $f(k, l)$ may be modified, for example, by applying clipping.

ALF with block-based adaption in VVC is described in M. Karczewicz et al., "VVC in-loop filters," IEEE Trans. Circuits Syst. Video Technol., vol. 31, no. 10, pp. 3907-3925, October 2021, and can be considered a state-of-the-art in-loop filter. Sub-block or pixel level filter adaptation is applied. Each M×M block is categorized into one out of 25 classes based on its directionality D and a quantized value of activity A:

$$C = 5D + A.$$

Each class may have its own filter assigned.

A Laplacian based classifier is used to derive class C for the samples in a target block. A window that covers the target block is used for classifying that target block. The activity and directionality are derived using values of the horizontal, vertical and two diagonal gradients calculated using 1-D Laplacian:

$$H_{k,l} = |2R(k, l) - R(k - 1, l) - R(k + 1, l)|,$$

$$V_{k,l} = |2R(k, l) - R(k, l - 1) - R(k, l + 1)|,$$

$$D1_{k,l} = |2R(k, l) - R(k - 1, l - 1) - R(k + 1, l + 1)|,$$

$$D2_{k,l} = |2R(k, l) - R(k - 1, l + 1) - R(k + 1, l - 1)|.$$

The sums of horizontal, vertical, and two diagonal gradients within the window are denoted, respectively, as $g_h$, $g_v$, $g_{d1}$ and $g_{d2}$. The directionality D is determined by comparing $$r_{h,v} = \frac{\max(g_h, g_v)}{\min(g_h, g_v)}, r_{d1,d2} = \frac{\max(g_{d1}, g_{d2})}{\min(g_{d1}, g_{d2})}$$

with a set of thresholds. The activity A is derived by calculating a sum of $g_h$ and $g_v$, and comparing it with the set of thresholds.

Before filtering, certain geometric transformations, such as rotation, diagonal and vertical flip, can be applied to the pixels in the filter support region (pixels which are multiplied by filtered coefficients) depending on the orientation of the gradient of the filtered pixel. These transformations increase similarity between different regions within the picture, e.g., their directionality. This may reduce the number of filters which have to be sent to the decoder, hence reducing the number of bits required to represent the filters, and/or reduce the reconstruction error. Applying the transformations to filter support region is equivalent to applying them directly to the filter coefficients.

To support filtering for all the classes, filters for all classes are signaled in one filter set. To reduce the number of bits required to represent the filter coefficients, different classes may be merged. The information regarding which classes are merged is provided by sending for each of the 25 classes an index $i_c$. Classes having the same index $i_c$ share the same filter. Therefore, in this example, a filter set contains up to 25 filters, where 25 is the number of classes.

In VVC version 1, ALF coefficients are signaled in ALF adaptation parameter sets (APS). One APS may contain one set of luma filters with up to 25 filters, up to 8 chroma filters and up to 8 cross-component ALF (CC-ALF) filters. Each set of luma filters support applying ALF to the luma 25 classes. In VVC version 1, up to 8 ALF_APSs are supported. Each coefficient is represented by a fixed-point number, and 8 bits are used to represent the fractional part. In one example, if a coefficient is 1, a numerator value of 128 is transmitted in the bit stream, such that 1=128/2^(bit depth-1) for a bit depth of 8 bits.

| | Descriptor |
|---|---|
| alf_data( ) { | |
|   alf_luma_filter_signal_flag | u(1) |
|   if( aps_chroma_present_flag ) { | |
|     alf_chroma_filter_signal_flag | u(1) |
|     alf_cc_cb_filter_signal_flag | u(1) |
|     alf_cc_cr_filter_signal_flag | u(1) |
|   } | |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[ altIdx ][ j ] | u(2) |

-continued

| | Descriptor |
|---|---|
| `    }` | |
| `  }` | |
| `  if( alf_cc_cb_filter_signal_flag ) {` | |
| `    alf_cc_cb_filters_signalled_minus1` | ue(v) |
| `    for( k = 0; k < alf_cc_cb_filters_signalled_minus1 + 1; k++ ) {` | |
| `      for( j = 0; j < 7; j++ ) {` | |
| `        alf_cc_cb_mapped_coeff_abs[ k ][ j ]` | u(3) |
| `        if( alf_cc_cb_mapped_coeff_abs[ k ][ j ] )` | |
| `          alf_cc_cb_coeff_sign[ k ][ j ]` | u(1) |
| `      }` | |
| `    }` | |
| `  }` | |
| `  if( alf_cc_cr_filter_signal_flag ) {` | |
| `    alf_cc_cr_filters_signalled_minus1` | ue(v) |
| `    for( k = 0; k < alf_cc_cr_filters_signalled_minus1 + 1; k++ ) {` | |
| `      for( j = 0; j < 7; j++ ) {` | |
| `        alf_cc_cr_mapped_coeff_abs[ k ][ j ]` | u(3) |
| `        if( alf_cc_cr_mapped_coeff_abs[ k ][ j ] )` | |
| `          alf_cc_cr_coeff_sign[ k ][ j ]` | u(1) |
| `      }` | |
| `    }` | |
| `  }` | |
| `}` | |

The ALF coefficients of reference pictures are stored and allowed to be reused as ALF coefficients of a current picture. For the current picture, a video decoder may choose to use ALF coefficients stored for the reference pictures, and bypass the ALF coefficients signaling. In this case, only an index to one of the reference pictures is signaled, and the stored ALF coefficients of the indicated reference picture are simply inherited for the current picture. In ECM, to filter a sample, an ALF filter is applied to several types of sample values, such as ALF input sample values of current and neighboring samples, fixed filter results of current and neighboring samples, gaussian filter results of current and neighboring samples, reconstructed residual values of current and neighboring samples, deblocking filter input sample values of current and neighboring samples. For each type of sample values, a filter shape is applied, the center coefficient is applied to this type of sample value of current sample.

According to techniques of this disclosure, a bit depth, e.g., a number of bits used to represent the denominator part of a coefficient, may be adaptive. In some examples, video encoder 200 may signal to video decoder 300 a bit depth for each coefficient. In some examples, video encoder 200 may signal to video decoder 300 a bit depth for each filter, such that the signaled bit depth is applied to all the coefficients in this filter. In some examples, video encoder 200 may signal to video decoder 300 a bit depth for a filter set, such that the signaled bit depth is applied to all the coefficients in all the filters in this filter set. In some examples, for one filter set, video encoder 200 may signal to video decoder 300 a first bit depth for a first group of filters, such that the first signaled bit depth is applied to all the coefficients in these the filters in the first group. Video encoder 200 may signal to video decoder a second bit depth for a second group of filters, such that the second signaled bit depth is applied to all the coefficients in these the filters in the second group.

In some examples, video encoder 200 may signal to video decoder 300 a bit depth for each color component, such that the signaled bit depth is applied to the coefficients in the filters that applied to the color component.

In some examples, video encoder 200 may signal to video decoder 300 a bit depth for each APS, such that the signaled bit depth is applied to the coefficients in the filters in the APS. In some examples, video encoder 200 may signal to video decoder 300 a bit depth at a sequence or group of pictures or picture or slice or group of blocks or block or sub-block level, such that the signaled bit depth is applied to the coefficients in the filters that applied to the sequence or group of pictures or picture or slice or group of blocks or block or sub-block level.

To signal a bit depth, video encoder 200 may signal to video decoder 300 an index, with each index being mapped to a bit depth. In another example, video encoder 200 may signal to video decoder 300 an offset such that a bit depth may be derived by adding the offset to a base bit depth.

In some examples, a bit depth may depend on whether non-linear (clipping) ALF is applied. In some examples, a bit depth may be inferred from the clipping flag.

The coefficients in a filter may be separated into several groups, and a bit depth may be signaled and/or applied for coefficients in each group. A bit depth of a coefficient may depend on the position of the coefficient in a filter shape. For example, video encoder 200 may signal to video decoder 300 a bit depth for coefficients that are located in the center of each filter shape (center coefficients are applied to intermediate results of a current sample, for example, fixed filter results of current sample, gaussian filter results of current sample, deblocking filter input sample value of current sample, reconstructed residual value of current sample). Video encoder 200 may signal to video decoder 300 another bit depth for coefficients that are not located in the center of each filter shape.

The order of a Golomb code used to signal a coefficient may depend on the bit depth and/or the position of the coefficient. In one example, when the bit depth of all coefficients is equal to a first bit depth in a first filter set, to signal the non-center coefficients, a first Golomb code order is determined by adding a first base order to a first signaled offset. To signal the center coefficients, a second Golomb coder order is determined by adding a second base order to a second signaled offset. When the bit depth of all coefficients is equal to a second bit depth in a second filter set, to signal the non-center coefficients, a third Golomb code order is determined by adding a third base order to a third signaled offset. To signal the center coefficients, a fourth Golomb coder order is determined by adding a fourth base order to a fourth signaled offset.

A bit depth of a coefficient may depend on the coding method of that coefficient. For example, when Golomb code is used to signal a coefficient, the bit depth of the coefficient may depend on the order of the Golomb code.

In some examples, video encoder 200 may signal to video decoder 300 a flag for a coefficient. If the flag is equal to one value, the coefficient is inferred to be zero. On the other hand, if the flag is equal to another value, the coefficient is inferred to be non-zero. Then a second value is derived, the absolute value of this coefficient then may then be derived by adding one to the second value.

Figure 2:
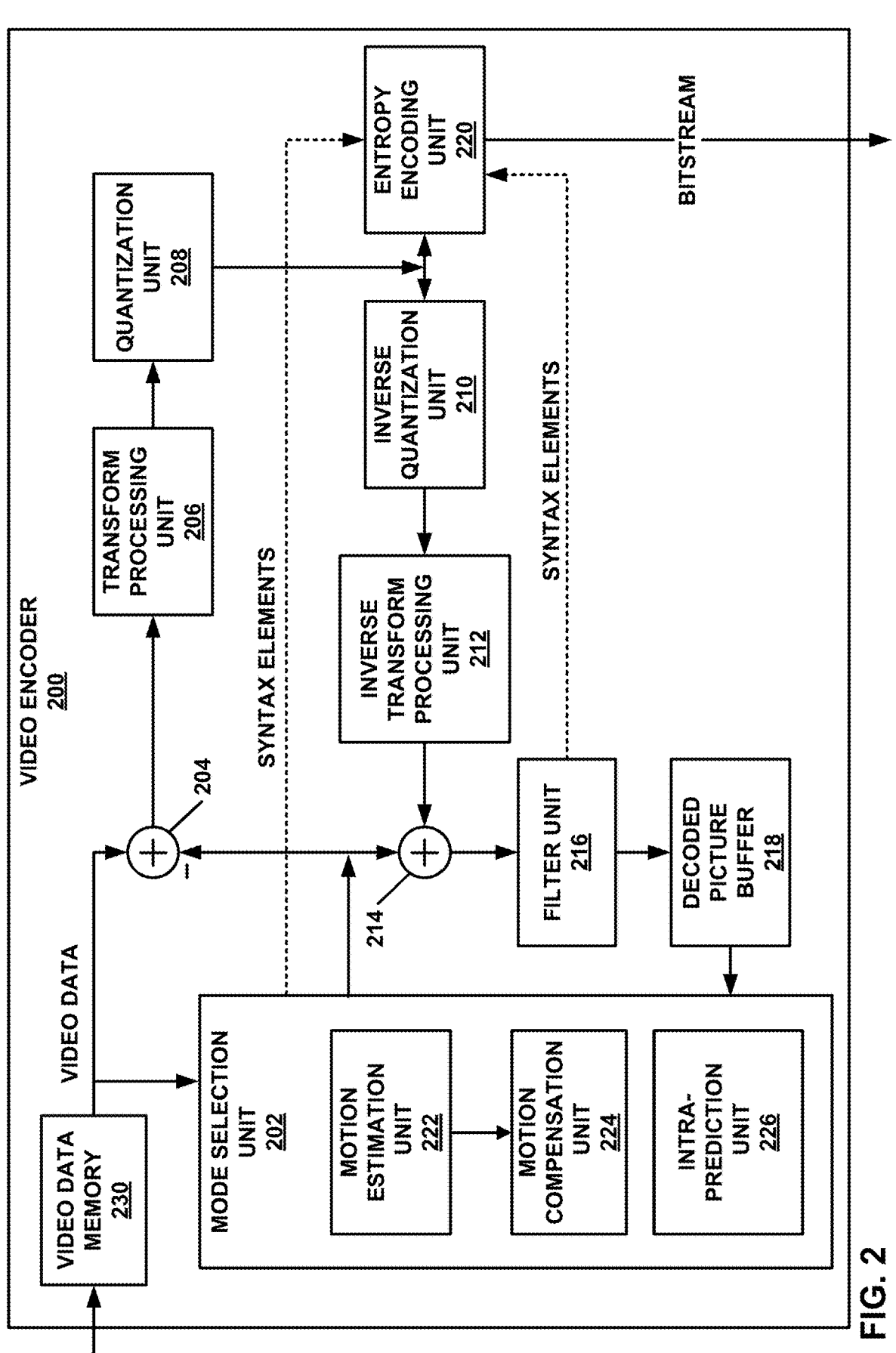
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2NxnU, 2NxnD, nLx2N, and nRx2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Filter unit 216 may additionally or alternatively perform SAO and/or ALF. When performing ALF, filter unit 216 may determine a bit depth for coefficients of ALF. Filter unit 216 may determine values for syntax elements to indicate the bit depth(s), and entropy encoding unit 220 encodes the values of those syntax elements into the encoded bitstream of video data.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a bit depth for one or more coefficients of an ALF.

Figure 3:
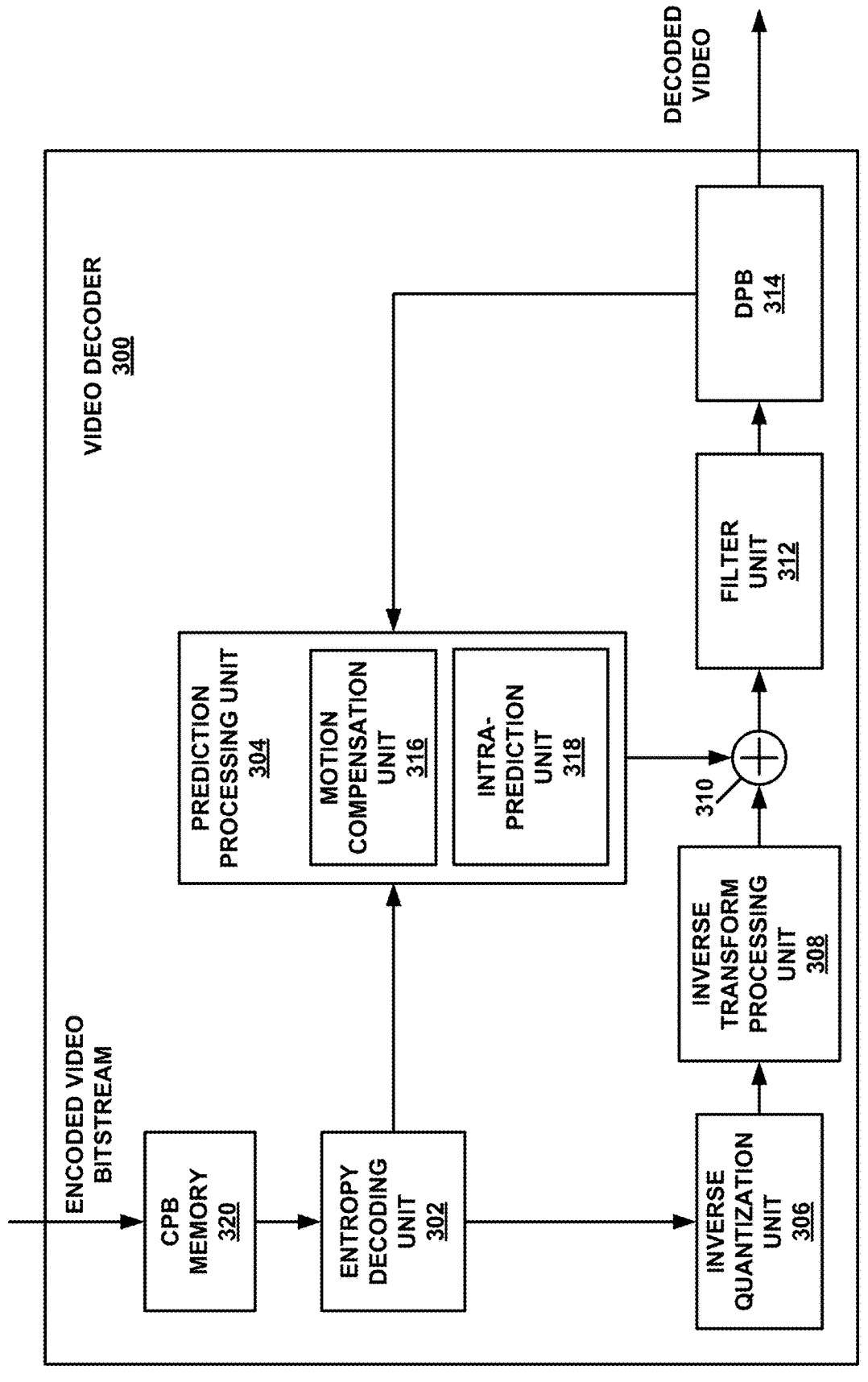
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. Filter unit 312 may, for example, apply ALF with adaptive bit depth coefficients as described herein.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a block of video data; determine an ALF for the block of video data, including determining a bit depth for a coefficient of the ALF; apply the ALF to the block of video data to determine a filtered block of video data; and output a decoded picture of video data that includes the filtered block of video data.

Figure 4:
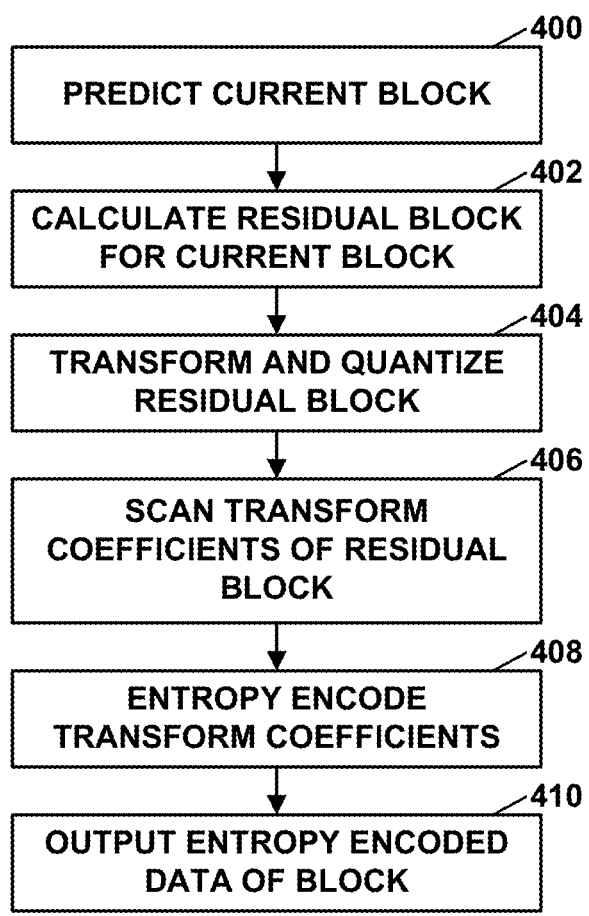
FIG. 4 is a flowchart illustrating an example process for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may form a reconstructed block by combining, e.g., adding, the prediction block and the residual block (510). Video decoder 300 may apply one or more filters to the reconstructed block to determine a filtered block of video data (512). Video decoder 300 may then output a decoded picture of video data that includes the filtered block of video data.

Figure 6:
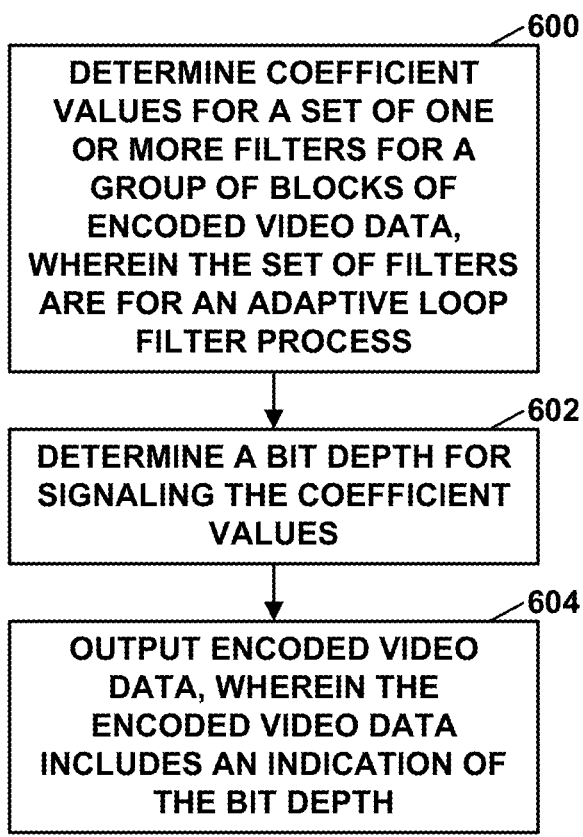
FIG. 6 is a flowchart illustrating an example process for encoding a current block in accordance with the techniques of this disclosure.

FIG. 6 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 6.

According to the technique of FIG. 6, video encoder 200 determines coefficient values for a set of one or more filters for a group of blocks of encoded video data, wherein the set of filters are for an adaptive loop filter process (600). To determine the real decimal coefficient values for the set of one or more filters, video encoder 200, may determine a fractional part of the coefficient values based on the bit depth and also determine a numerator portion of the coefficient values. The fractional, or denominator, part of the coefficient values may be equal to 2^(bit depth-1), and the numerator may be a signaled value at the bit depth. Thus, the coefficient may be viewed as a numerator divided by a denominator.

Video encoder 200 determines a bit depth for signaling the coefficient values (602). Video encoder 200 outputs encoded video data, wherein the encoded video data includes an indication of the bit depth (604). The indication of the bit depth may, for example, be an index value that maps to the bit depth from a plurality of available bit depths for the adaptive loop filter. The encoded video data may also include indications of the coefficient values, such as values for alf_chroma_coeff_abs and alf_chroma_coeff_sign.

FIG. 7 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 7.

In the example of FIG. 7, video decoder 300 determines a block from the encoded video data (700). Video decoder 300 may, for example, determine a reconstructed block by adding a prediction block to a residual block to determine a reconstructed block.

Video decoder 300 determines a bit depth for an adaptive loop filter from a plurality of available bit depths for the adaptive loop filter (702). To determine the bit depth for the adaptive loop filter from the plurality of available bit depths for the adaptive loop filter, video decoder 300 may, for example, receive an index value in the encoded video data and map the index value to the bit depth. To determine the bit depth for the adaptive loop filter from the plurality of available bit depths for the adaptive loop filter, video decoder 300 may, for example, determine the bit depth for a set of adaptive loop filters that includes the adaptive loop filter, and all coefficients of all the adaptive loop filters in the set may use the bit depth.

Video decoder 300 determines coefficient values for a set of filter coefficients for the adaptive loop filter based on the bit depth (704). To determine the coefficient values for the set of filter coefficients for the adaptive loop filter based on the bit depth, video decoder 300 may, for example, determine a fractional part of the coefficient values based on the bit depth. The real decimal value of the coefficient values may be equal to the signaled coefficient value divided by 2^(bd-1) with a value of bd being equal to the bit depth. To determine the coefficient decimal values for the set of filter coefficients for the adaptive loop filter based on the bit depth, video decoder 300 may, for example, receive a numerator value in the encoded video data and determine a coefficient decimal value for the set of filter coefficients to be equal to the numerator value divided by 2^(bd-1), wherein a value of bd is equal to the bit depth.

Video decoder 300 applies the adaptive loop filter to the block to determine a filtered block of video data (706). Video decoder 300 determines a decoded version of the block of video data based on the filtered block of video data (708). In some examples, the decoded version of the block may be the same as the filtered block of video data. In other examples, video decoder 300 may apply additional processing to the filtered block to determine the decoded version of the block.

Video decoder 300 outputs a decoded picture of video data that includes the decoded version of the block of video data (710). Video decoder 300 may for example output the decoded picture for display or output the decoded picture for storage or transmission. Video decoder 300 may store the decoded picture in a decoded picture buffer for use in decoding other pictures of the encoded video data.

The following numbered clauses illustrate one or more aspects of the devices and techniques described in this disclosure.

Clause 1A: A method of decoding video data, the method comprising: determining a block of video data; determining an adaptive loop filter (ALF) for the block of video data, wherein determining the ALF comprises determining a bit depth for a coefficient of the ALF; applying the ALF to the block of video data to determine a filtered block of video data; and outputting a decoded picture of video data that includes the filtered block of video data.

Clause 2A: The method of clause 1A, wherein determining the bit depth for the coefficient of the ALF comprises receiving one or more syntax elements and determining the bit depth based on values of the one or more syntax elements.

Clause 3A: The method of clause 1A or 2A, wherein determining the block of video data comprises: determining a prediction block for the block of video data; determining a residual block for the block of video data; and combining the prediction block and the residual block to determine a reconstructed block of video data.

Clause 4A: The method of clause 3A, wherein determining the block of video data further comprises: applying one or more filters to the reconstructed block of video data.

Clause 5A: A device for coding video data, the device comprising one or more means for performing the method of any of clauses 1A-4A.

Clause 6A: The device of clause 5A, wherein the one or more means comprise one or more processors implemented in circuitry.

Clause 7A: The device of any of clauses 5A and 6A, further comprising a memory to store the video data.

Clause 8A: The device of any of clauses 5A-7A, further comprising a display configured to display decoded video data.

Clause 9A: The device of any of clauses 5A-8A, wherein the device comprises one or more of a camera, a computer, a mobile device, a broadcast receiver device, or a set-top box.

Clause 10A: The device of any of clauses 5A-9A, wherein the device comprises a video decoder.

Clause 11A: The device of any of clauses 5A-10A, wherein the device comprises a video encoder.

Clause 12A: A computer-readable storage medium having stored thereon instructions that, when executed, cause one or more processors to perform the method of any of clauses 1A-4A.

Clause 1B: A method of decoding encoded video data, the method comprising: determining a block from the encoded video data; determining a bit depth for an adaptive loop filter from a plurality of available bit depths for the adaptive loop filter; determining coefficient values for a set of filter coefficients for the adaptive loop filter based on the bit depth; applying the adaptive loop filter to the block to determine a filtered block of video data; determining a decoded version of the block of video data based on the filtered block of video data; and outputting a decoded picture of video data that includes the decoded version of the block of video data.

Clause 2B: The method of clause 1B, wherein determining the bit depth for the adaptive loop filter from the plurality of available bit depths for the adaptive loop filter comprises: receiving an index value in the encoded video data; and mapping the index value to the bit depth.

Clause 3B: The method of clause 1B or 2B, wherein determining the coefficient values for the set of filter coefficients for the adaptive loop filter based on the bit depth comprises determining a denominator part of the coefficient values based on the bit depth.

Clause 4B: The method of clause 3B, wherein the denominator part of the coefficient values is equal to $2^{\hat{}}(bd-1)$, wherein a value of bd is equal to the bit depth.

Clause 5B: The method of any of clauses 1B-4B, wherein determining the bit depth for the adaptive loop filter from the plurality of available bit depths for the adaptive loop filter comprises determining the bit depth for a set of adaptive loop filters, wherein the set of adaptive loop filters includes the adaptive loop filter and all coefficients of all the adaptive loop filters in the set use the bit depth.

Clause 6B: The method of any of clauses 1B-5B, wherein determining the coefficient values for the set of filter coefficients for the adaptive loop filter based on the bit depth comprises: receiving a numerator value in the encoded video data; and determining a coefficient value for the set of filter coefficients to be equal to the numerator value divided by $2^{\hat{}}(bd-1)$, wherein a value of bd is equal to the bit depth.

Clause 7B: The method of any of clauses 1B-6B, further comprising: determining an order for a Golomb code based on the bit depth; and determining the coefficient values for the set of filters based on the order for the Golomb code.

Clause 8B: A device for decoding encoded video data, the device comprising: a memory; and one or more processors implemented in circuitry, coupled to the memory, and configured to: determine a block from the encoded video data; determine a bit depth for an adaptive loop filter from a plurality of available bit depths for the adaptive loop filter; determine coefficient values for a set of filter coefficients for the adaptive loop filter based on the bit depth; apply the adaptive loop filter to the block to determine a filtered block of video data; determine a decoded version of the block of video data based on the filtered block of video data; and output a decoded picture of video data that includes the decoded version of the block of video data.

Clause 9B: The device of clause 8B, wherein to determine the bit depth for the adaptive loop filter from the plurality of available bit depths for the adaptive loop filter, the one or more processors are further configured to: receive an index value in the encoded video data; and map the index value to the bit depth.

Clause 10B: The device of clause 8B or 9B, wherein to determine the coefficient values for the set of filter coefficients for the adaptive loop filter based on the bit depth, the one or more processors are further configured to determine a denominator part of the coefficient values based on the bit depth.

Clause 11B: The device of clause 10B, wherein the denominator part of the coefficient values is equal to $2^{\hat{}}(bd-1)$, wherein a value of bd is equal to the bit depth.

Clause 12B: The device of any of clauses 8B-11B, wherein to determine the bit depth for the adaptive loop filter from the plurality of available bit depths for the adaptive loop filter, the one or more processors are further configured to determine the bit depth for a set of adaptive loop filters, wherein the set of adaptive loop filters includes the adaptive loop filter and all coefficients of all the adaptive loop filters in the set use the bit depth.

Clause 13B: The device of any of clauses 8B-12B, wherein to determine the coefficient values for the set of filter coefficients for the adaptive loop filter based on the bit depth, the one or more processors are further configured to: receive a numerator value in the encoded video data; and determine a coefficient value for the set of filter coefficients to be equal to the numerator value divided by $2^{\hat{}}(bd-1)$, wherein a value of bd is equal to the bit depth.

Clause 14B: The device of any of clauses 8B-13B, wherein the device comprises a wireless communication device, further comprising a receiver configured to receive the encoded video data.

Clause 15B: The device of any of clauses 8B-14B, further comprising: a display configured to display the decoded picture of video data.

Clause 16B: A method of encoding video data, the method comprising: determining coefficient values for a set of one or more filters for a group of blocks of encoded video data, wherein the set of filters are for an adaptive loop filter process; determining a bit depth for signaling the coefficient values; and outputting encoded video data, wherein the encoded video data includes an indication of the bit depth.

Clause 17B: The method of clause 16B, wherein the indication of the bit depth comprises an index value that maps to the bit depth from a plurality of available bit depths for the adaptive loop filter process.

Clause 18B: The method of clause 16B or 17B, wherein determining the coefficient values for the set of one or more filters comprises determining a denominator part of the coefficient values based on the bit depth, wherein the denominator part of the coefficient values is equal to $2^{\hat{}}(bd-1)$, wherein a value of bd is equal to the bit depth.

Clause 19B: The method of any of clauses 16B-18B, wherein the encoded video data includes indications of the coefficient values.

Clause 20B: The method of any of clauses 16B-19B, wherein determining the coefficient values for the set of filter coefficients for the adaptive loop filter process comprises: determining a numerator value; and determining a coefficient value of the coefficient values to be equal to the numerator value divided by $2^{\hat{}}(bd-1)$, wherein a value of bd is equal to the bit depth.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
    determining a block from the encoded video data;
    determining a bit depth for an adaptive loop filter from a plurality of available bit depths for the adaptive loop filter;
    determining coefficient values for a set of filter coefficients for the adaptive loop filter based on the bit depth;

applying the adaptive loop filter to the block to determine a filtered block of video data;
    determining a decoded version of the block of video data based on the filtered block of video data; and
    outputting a decoded picture of video data that includes the decoded version of the block of video data.

2. The method of claim 1, wherein determining the bit depth for the adaptive loop filter from the plurality of available bit depths for the adaptive loop filter comprises:
    receiving an index value in the encoded video data; and
    mapping the index value to the bit depth.

3. The method of claim 1, wherein determining the coefficient values for the set of filter coefficients for the adaptive loop filter based on the bit depth comprises determining a denominator part of the coefficient values based on the bit depth.

4. The method of claim 3, wherein the denominator part of the coefficient values is equal to $2^{(bd-1)}$, wherein a value of bd is equal to the bit depth.

5. The method of claim 1, wherein determining the bit depth for the adaptive loop filter from the plurality of available bit depths for the adaptive loop filter comprises determining the bit depth for a set of adaptive loop filters, wherein the set of adaptive loop filters includes the adaptive loop filter and all coefficients of all the adaptive loop filters in the set use the bit depth.

6. The method of claim 1, wherein determining the coefficient values for the set of filter coefficients for the adaptive loop filter based on the bit depth comprises:
    receiving a numerator value in the encoded video data; and
    determining a coefficient value for the set of filter coefficients to be equal to the numerator value divided by $2^{(bd-1)}$, wherein a value of bd is equal to the bit depth.

7. The method of claim 1, further comprising:
    determining an order for a Golomb code based on the bit depth; and
    determining the coefficient values for the set of filters based on the order for the Golomb code.

8. A device for decoding encoded video data, the device comprising:
    a memory; and
    one or more processors implemented in circuitry, coupled to the memory, and configured to:
        determine a block from the encoded video data;
        determine a bit depth for an adaptive loop filter from a plurality of available bit depths for the adaptive loop filter;
        determine coefficient values for a set of filter coefficients for the adaptive loop filter based on the bit depth;
        apply the adaptive loop filter to the block to determine a filtered block of video data;
        determine a decoded version of the block of video data based on the filtered block of video data; and
        output a decoded picture of video data that includes the decoded version of the block of video data.

9. The device of claim 8, wherein to determine the bit depth for the adaptive loop filter from the plurality of available bit depths for the adaptive loop filter, the one or more processors are further configured to:
    receive an index value in the encoded video data; and
    map the index value to the bit depth.

10. The device of claim 8, wherein to determine the coefficient values for the set of filter coefficients for the adaptive loop filter based on the bit depth, the one or more processors are further configured to determine a denominator part of the coefficient values based on the bit depth.

11. The device of claim 10, wherein the denominator part of the coefficient values is equal to $2^{(bd-1)}$, wherein a value of bd is equal to the bit depth.

12. The device of claim 8, wherein to determine the bit depth for the adaptive loop filter from the plurality of available bit depths for the adaptive loop filter, the one or more processors are further configured to determine the bit depth for a set of adaptive loop filters, wherein the set of adaptive loop filters includes the adaptive loop filter and all coefficients of all the adaptive loop filters in the set use the bit depth.

13. The device of claim 8, wherein to determine the coefficient values for the set of filter coefficients for the adaptive loop filter based on the bit depth, the one or more processors are further configured to:

receive a numerator value in the encoded video data; and determine a coefficient value for the set of filter coefficients to be equal to the numerator value divided by $2^{(bd-1)}$, wherein a value of bd is equal to the bit depth.

14. The device of claim 8, wherein the device comprises a wireless communication device, further comprising a receiver configured to receive the encoded video data.

15. The device of claim 8, further comprising:

a display configured to display the decoded picture of video data.

16. A method of encoding video data, the method comprising:

determining coefficient values for a set of one or more filters for a group of blocks of encoded video data, wherein the set of filters are for an adaptive loop filter process;

determining a bit depth for signaling the coefficient values; and outputting encoded video data, wherein the encoded video data includes an indication of the bit depth.

17. The method of claim 16, wherein the indication of the bit depth comprises an index value that maps to the bit depth from a plurality of available bit depths for the adaptive loop filter process.

18. The method of claim 16, wherein determining the coefficient values for the set of one or more filters comprises determining a denominator part of the coefficient values based on the bit depth, wherein the denominator part of the coefficient values is equal to $2^{(bd-1)}$, wherein a value of bd is equal to the bit depth.

19. The method of claim 16, wherein the encoded video data includes indications of the coefficient values.

20. The method of claim 16, wherein determining the coefficient values for the set of filter coefficients for the adaptive loop filter process comprises:

determining a numerator value; and determining a coefficient value of the coefficient values to be equal to the numerator value divided by $2^{(bd-1)}$, wherein a value of bd is equal to the bit depth.

* * * * *